(12) United States Patent
Lee

(10) Patent No.: US 7,464,748 B2
(45) Date of Patent: Dec. 16, 2008

(54) INTERCOOLER SYSTEM AND INTAKE AIR COOLING METHOD

(75) Inventor: Joon Suk Lee, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 769 days.

(21) Appl. No.: 11/003,909

(22) Filed: Dec. 3, 2004

(65) Prior Publication Data
US 2005/0121006 A1  Jun. 9, 2005

(30) Foreign Application Priority Data
Dec. 5, 2003  (KR) .................. 10-2003-0088020

(51) Int. Cl.
*B60H 1/00* (2006.01)
*F02B 29/04* (2006.01)
*B60K 11/04* (2006.01)
*F01P 1/06* (2006.01)

(52) U.S. Cl. ................. 165/202; 165/41; 165/42; 165/43; 165/51; 165/299; 123/563; 123/142.5 R; 60/599; 62/244

(58) Field of Classification Search .......... 165/41, 165/51, 202, 299, 42, 43; 123/563, 142.5 R; 60/599; 62/244
See application file for complete search history.

(56) References Cited

U.S. PATENT DOCUMENTS

| 5,036,668 A | * | 8/1991 | Hardy ..................... 60/599 |
| 5,937,940 A | * | 8/1999 | Davis et al. ................. 165/202 |
| 7,017,531 B2 | * | 3/2006 | Wooldridge et al. ........ 123/563 |

FOREIGN PATENT DOCUMENTS

| JP | 63101120 A | * | 5/1988 |
| JP | 06-081664 | | 3/1994 |
| JP | 2002-180864 | | 6/2002 |
| KR | 10-2002-0029833 | | 4/2002 |
| KR | 10-2003-0027265 | | 4/2003 |

* cited by examiner

Primary Examiner—John K Ford
(74) Attorney, Agent, or Firm—Morgan, Lewis & Bockius LLP

(57) ABSTRACT

An intercooler system includes an air duct configured to be supplied with outside air, an evaporator, and a heater core of an air-conditioning system being disposed within the air duct. An intercooler is supplied with the outside air from the air duct and configured to cool intake air passing therethrough using the outside air. A valve unit regulates flow of the outside air such that the outside air passes at least one of the evaporator and the heater core and is then supplied to the intercooler. Also, a control unit controls operation of the air-conditioning system and the valve unit.

23 Claims, 4 Drawing Sheets

INTERCOOLER SYSTEM AND INTAKE AIR COOLING METHOD

CROSS REFERENCE TO RELATED APPLICATION

This application claims priority of Korean Application No. 10-2003-0088020, filed on Dec. 5, 2003, the disclosure of which is incorporated herein by reference.

TECHNICAL FIELD OF THE INVENTION

The present invention generally relates to an intercooler system and a method for cooling intake air. More particularly, the intercooler system and method regulates air temperature of air cooling the intercooler by using an air-conditioning system.

BACKGROUND OF THE INVENTION

Generally, an intercooler is used in an internal combustion engine that utilizes a turbo charger. Pressurization of intake air by the turbo charger increases temperature of the intake air. If the temperature of the intake air increases excessively, combustion characteristics within the engine deteriorate. Therefore, an intercooler is commonly used to decrease the temperature of the intake air.

There are various types of conventional intercoolers, for example, an air-cooling type intercooler that cools down intake air using a flow of external air and a water-cooling type intercooler that cools down intake air using cooling water. Conventional intercoolers simply cool the intake air that is supplied to combustion chambers, but they do not cool the intake air at an optimal temperature.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

According to an embodiment of the present invention, an intercooler system and an intake air cooling method is provided in which a temperature of outside air cooling the intercooler is optimally regulated using an air-conditioning system. Therefore, an air-conditioning system is used to cool the intake air passing through the intercooler to an optimal temperature.

In a preferred embodiment, an intercooler system includes an air duct configured to be supplied with outside air, an evaporator, and a heater core of an air-conditioning system being disposed within the air duct. An intercooler is supplied with outside air from the air duct and is configured to cool the intake air passing therethrough. A valve unit regulates flow of the outside air such that the outside air passes at least one of the evaporator and the heater core before being supplied to the intercooler. A control unit controls operations of the air-conditioning system and the valve unit. Preferably, the intercooler system further includes a coolant temperature sensor for detecting a coolant temperature.

During operation, the control unit controls operations of the valve unit based on the detected coolant temperature. If the detected coolant temperature is lower than a predetermined coolant temperature, the control unit controls the valve unit such that the outside air passes the heater core before being supplied to the intercooler. However, if the detected coolant temperature is higher than a predetermined coolant temperature, the control unit controls the valve unit and the air-conditioning system such that the outside air is cooled by the evaporator before being supplied to the intercooler.

It is preferable that a portion of an inner passage of the air duct is divided into a first passage and a second passage. The first passage and second passage are located downstream of the evaporator. Furthermore, the heater core is disposed within the first passage. The first passage communicates with the intercooler through a third passage arranged at an upstream portion of the heater core and communicates with the intercooler through a fourth passage arranged at a downstream portion of the heater core.

The valve unit includes a first valve configured to selectively open and close the first passage upstream of the heater core and the third passage. A second valve is configured to selectively open and close the first passage downstream of the heater core and the fourth passage. Also, a third valve is configured to selectively open and close the second passage.

Preferably, the intercooler system further has a coolant temperature sensor for detecting a coolant temperature. The control unit controls operations of the first, second, and third valves based on the detected coolant temperature. Further preferably, if the detected coolant temperature is lower than a predetermined coolant temperature, the control unit controls the first valve such that the first passage is opened upstream of the heater core while closing the third passage. Also, the second valve is closed such that the fourth passage is opened so that the outside air is heated by the heater core and before being supplied to the intercooler.

Still further preferably, the intercooler system has an air-conditioning system operating mode switch that detects a current operating mode of the air-conditioning system. If the current mode of the air-conditioning system is neither in a heating mode, for heating air inside a passenger room of the vehicle, nor a cooling mode, for cooling air inside the passenger room of the vehicle, the control unit controls the second valve such that the first passage is closed downstream of the heater core. Thereby, the control unit operatively closes a passage connected to the passenger room of the vehicle and controls the third valve such that the second passage is closed.

Preferably, the intercooler system further includes an air-conditioning system operating mode switch for detecting a current operating mode of the air-conditioning system. If the current operating mode of the air-conditioning system is in a cooling mode for cooling air inside the passenger room of the vehicle, the control unit controls the second valve such that the first passage is closed downstream of the heater core to close a passage connected to the passenger room. The control unit also controls the third valve such that the second passage is opened.

If a current operating mode of the air-conditioning system is in a heating mode, for heating air inside the passenger room of the vehicle, the control unit controls the second valve such that the first passage is opened downstream of the heater core and controls the third valve such that the second passage is closed.

Preferably, if the detected coolant temperature is higher than a predetermined coolant temperature, the control unit controls the air-conditioning system to operate the evaporator. Also, the control unit controls the first valve such that the third passage is opened, and controls the second valve such that the fourth passage is closed, such that the outside air is cooled by the evaporator before being supplied to the intercooler.

If the current operating mode of the air-conditioning system is neither in a heating mode, for heating air inside the passenger room of the vehicle, nor in a cooling mode for cooling air inside the passenger room of the vehicle, the control unit controls the first valve to close the first passage upstream of the heater core and controls the third valve to close the second passage.

If the current operating mode of the air-conditioning system is in a cooling mode, for cooling air inside the passenger room of the vehicle, the control unit controls the first valve to close the first passage upstream of the heater core and controls the third valve to open the second passage.

If the current operating mode of the air-conditioning system is in a heating mode, for heating air inside the passenger room of the vehicle, the control unit controls the first valve to open the first passage upstream of the heater core and controls the third valve to close the second passage.

In another embodiment of the present invention, an intercooler system includes an air duct configured to be supplied with outside air, an evaporator, and a heater core of an air-conditioning system being disposed within an inner passage of the air duct. A portion of the inner passage of the air duct is divided into a first passage and a second passage downstream of the evaporator. The heater core is disposed in the first passage with an intercooler connected to the first passage upstream of the heater core through a third passage and connected to the first passage downstream of the heater core through a fourth passage. The intercooler being configured to cool intake air passing therethrough. The intercoller uses the outside air being supplied from the air duct through one of the third and fourth passages. A first valve is configured to selectively open or close the first passage upstream of the heater core and the third passage. A second valve is configured to selectively open or close the first passage downstream of the heater core and the fourth passage. A third valve is configured to selectively open or close the second passage. And a control unit is configured to control the air-conditioning system to cool or heat the outside air, control the first, second, and third valves such that cooled outside air is supplied to the intercooler or such that heated outside air is supplied to the intercooler, depending upon a determined condition.

Preferably, the intercooler system further has a coolant temperature sensor for detecting a coolant temperature and the control unit controls operations of the first, second, and third valves based on the detected coolant temperature.

If the detected coolant temperature is lower than a predetermined coolant temperature, the control unit controls the first valve to open the first passage upstream of the heater core and close the third passage. The control unit also controls the second valve such that the fourth valve is opened so that the outside air is heated by the heater core and before being supplied to the intercooler.

Preferably, the intercooler system further includes an air-conditioning system operating mode switch for detecting a current operation mode of the air-conditioning system of the vehicle. If the current operating mode of the air-conditioning system is neither in a heating mode, for heating air inside the passenger room of the vehicle, nor a cooling mode, for cooling air inside the passenger room of the vehicle, the control unit controls the second valve such that the first passage is closed downstream of the heater core and controls the third valve such that the second passage is closed. If the current operating mode of the air-conditioning system is in a cooling mode, for cooling air inside the passenger room of the vehicle, the control unit controls the second valve such that the first passage is closed downstream of the heater core and controls the third valve such that the second passage is opened. If the current operating mode of the air-conditioning system is in a heating mode, for heating air inside the passenger room of the vehicle, the control unit controls the second valve such that the first passage is opened downstream of the heater core and controls the third valve such that the second passage is closed.

Preferably, if the detected coolant temperature is higher than a predetermined coolant temperature, the control unit controls the air-conditioning system to operate the evaporator. The control unit controls the first valve such that the third passage is opened and controls the second valve such that the fourth passage is closed. Therefore, the outside air is cooled by the evaporator and is then supplied to the intercooler.

Preferably, the intercooler system further includes an air-conditioning system operating mode switch. The operating mode switch detects a current operating mode of the air-conditioning system. If the current operating mode of the air-conditioning system is neither in a heating mode for heating air inside the passenger room nor in a cooling mode for cooling air inside the passenger room, the control unit controls the first valve such that the first passage is closed upstream of the heater core and controls the third valve such that the second passage is closed. If the current operating mode of the air-conditioning system is in a cooling mode for cooling air inside a passenger room, the control unit controls the second valve such that the first passage is closed upstream of the heater core and controls the third valve such that the second passage is opened. If the current operating mode of the air-conditioning system is in a heating mode, for heating air inside the passenger room of the vehicle, the control unit controls the first valve such that the first passage is opened upstream of the heater core and controls the third valve such that the second passage is closed.

In an embodiment of the present invention, an intake air cooling method using an air-conditioning system and an intercooler configured to cool intake air using outside air supplied from the air-conditioning system includes detecting a coolant temperature, regulating a temperature of the outside air by heating or cooling the outside air using the air-conditioning system based on the detected coolant temperature, and cooling the intake air introduced into the intercooler using the cooled or heated outside air.

According to an embodiment, the regulating includes determining whether the detected coolant temperature is lower than a predetermined coolant temperature and heating the outside air using the air-conditioning system, if the detected coolant temperature is lower than the predetermined coolant temperature.

According to another embodiment, the regulating includes determining whether the detected coolant temperature is lower than a predetermined coolant temperature and cooling the outside air using the air-conditioning system, if the detected coolant temperature is higher than the predetermined coolant temperature.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF PREFERRED EMBODIMENTS

Figure 1:
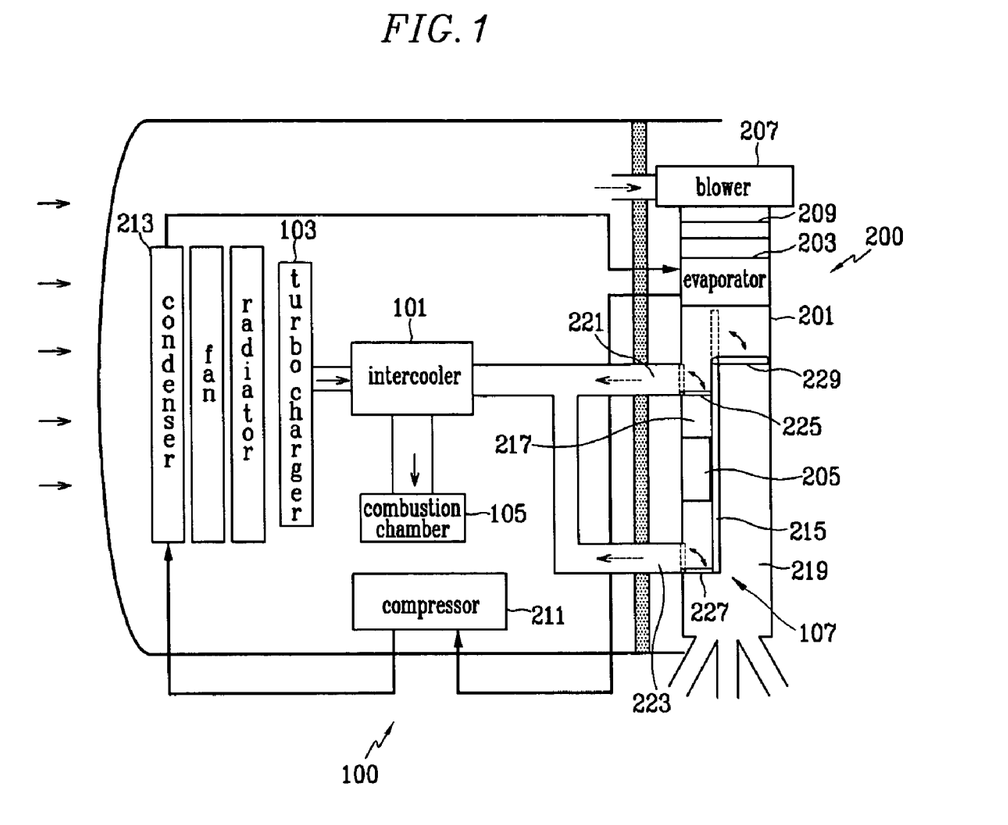
FIG. 1 is a schematic diagram of an intercooler system according to an embodiment of the present invention.

As shown in FIG. 1, an intercooler system 100 according to an embodiment of the present invention uses an air-conditioning system 200 of a vehicle. The air-conditioning system 200 includes an evaporator 203 and a heater core 205 that are respectively disposed within an inner passage of an air duct 201. Preferably, the heater core 205 is disposed downstream of the evaporator 203. Outside air that is drawn into the air duct 201 passes a blower 207 and an air filter 209 and then passes through the evaporator 203 and/or the heater core 205. As will be appreciated by one of ordinary skill in the art, the air-conditioning system 200 is a system for controlling the temperature and humidity of air in a passenger room of the vehicle.

Operating modes of the air-conditioning system 200 can be divided into a heating mode and a cooling mode. When the air-conditioning system 200 operates in the heating mode, the air-conditioning system 200 heats air inside a passenger room of a vehicle. For example, in the heating mode, the air-conditioning system 200 may heat outside air and supply the heated air into the passenger room of the vehicle to increase a temperature in the passenger room. On the other hand, when the air-conditioning system 200 operates in the cooling mode, the air-conditioning system 200 cools down air inside the passenger room. For example, the air-conditioning system 200 may cool down outside air and supply the cooled air into the passenger room of the vehicle to decrease the temperature in the passenger room.

The air-conditioning system 200 further includes a compressor 211 and a condenser 213. A refrigerant of the air-conditioning system 200 circulates between the evaporator 203, the compressor 211, and the condenser 213. If the compressor 211 operates, the heat of the outside air passing the evaporator 203 is transmitted to the refrigerant, so that the outside air is cooled while passing across the evaporator 203. The outside air is cooled during this process and the cooled air is supplied to the passenger room of the vehicle through ducts.

During heating, when outside air passes the heater core 205, the outside air is heated by heat transmitted from hot water flowing in the heater core 205. The air heated by the heater core 205 is supplied to the passenger room.

An intercooler 101 cools engine intake air having passed through a turbo charger 103. Preferably, the intercooler 101 is configured to cool the intake air passing therethrough using outside air supplied from the air duct 201. The intake air cooled by the intercooler 101 is then supplied to a combustion chamber 105.

A valve unit 107 is disposed within the air duct 201. The valve unit 107 controls flow of the outside air such that the outside air is supplied to the intercooler 101 after passing at least one of the evaporator 203 and the heater core 205.

Figure 2:
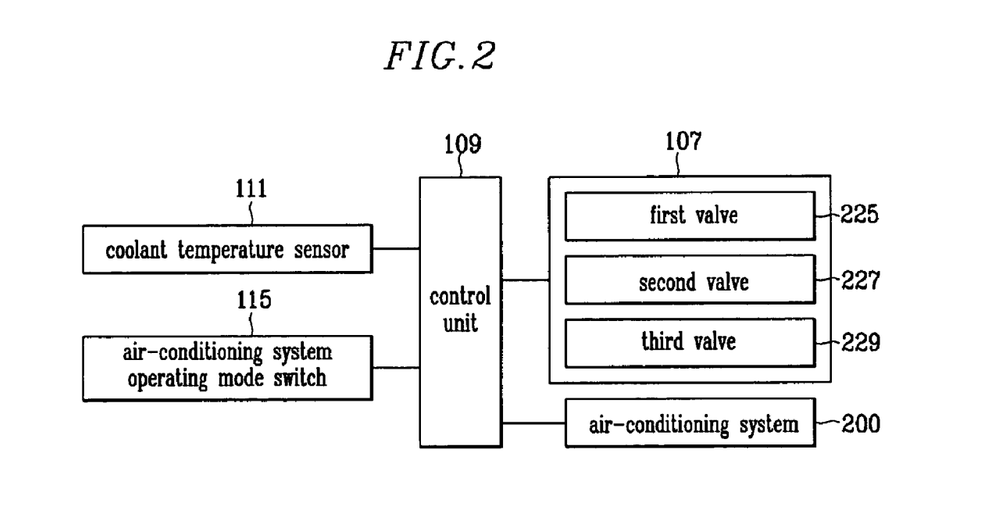
FIG. 2 is a block diagram of a control system of an intercooler system according to an embodiment of the present invention.

As shown in FIG. 2, a control unit 109 controls operations of the valve unit 107 and the air-conditioning system 200 based on signals of a coolant temperature sensor 111 and an air-conditioning system operating mode switch 115. The coolant temperature sensor 111 detects a temperature of a coolant circulating in an engine and outputs a corresponding signal.

The air-conditioning system operating mode switch 115 detects whether a current operating mode of the air-conditioning system is in the heating mode or the cooling mode and outputs a corresponding signal. Further, when the current operating mode of the air-conditioning system 200 is neither in the heating mode nor the cooling mode, i.e., when a temperature inside a passenger room is not regulated by the air conditioning, the air-conditioning system operating mode switch 115 outputs a corresponding signal. The control unit 109 may include a processor, associated hardware, and circuitry as may be selected and programmed by a person of ordinary skill in the art based on the teachings of the present invention.

The control unit 109 may preferably control the operation of the valve unit 107 based on the detected coolant temperature and a predetermined coolant temperature. The predetermined coolant temperature can be set at a coolant temperature in which it may be determined that an engine is sufficiently warmed up. For example, the predetermined coolant temperature can be set at 100 degrees. As a result, the control unit 109 controls an operation of the valve unit 107 based on a comparison of the detected coolant temperature and the predetermined coolant temperature.

If the detected coolant temperature is lower then the predetermined coolant temperature, the control unit 109 controls the valve unit 107 such that the outside air is heated by the heater core 205 and then supplied to the intercooler 101.

On the other hand, if the detected coolant temperature is not lower than the predetermined coolant temperature, the control unit 109 controls the valve unit 107 and the air-conditioning system 200 such that the outside air is cooled by the evaporator 203 and is then supplied to the intercooler 101 without passing the heater core 205.

Hereinafter, the valve unit 107 and controls of the valve unit 107 by the control unit 109 will be explained in detail. A portion of the air duct 201 is divided into a first passage 217 and a second passage 219 downstream of the evaporator 203 by a dividing wall 215. The heater core 205 is disposed in the first passage 217.

A portion of the first passage 217 communicates with the intercooler 101 upstream of the heater core 205 through a third passage 221. A portion of the first passage 217 communicates with the intercooler 101 downstream of the heater core 205 through a fourth passage 223.

The valve unit 107 includes a first valve 225, a second valve 227, and a third valve 229. Preferably, each of the first valve 225, second valve 227, and third valve 229 may include a valve plate and an actuator to rotate the valve plate. For example, the actuator can be an electric motor. By controlling the actuators, the control unit 109 may control operations of the first valve 225, second valve 227, and third valve 229.

The first valve 225 is disposed and configured to selectively open or close the first passage 217 at a portion upstream of the heater core 205 and the third passage 221. If the first valve 225 is positioned as illustrated in the solid line in FIG. 1, the first passage 217 is closed upstream of the heater core 205 and the third passage 221 is opened. On the other hand, if the first valve 225 is positioned as illustrated in the dotted line in FIG. 1, the first passage 217 is opened upstream of the heater core 205 and the third passage 221 is closed.

The second valve 227 is disposed and configured to selectively open or close the first passage 217 at a portion downstream of the heater core 205 and the fourth passage 223. If the second valve 227 is positioned as illustrated in a solid line in FIG. 1, the first passage 217 is closed downstream of the heater core 205 and the fourth passage 223 is opened. On the other hand, if the second valve 227 is positioned as in a dotted line in FIG. 1, the first passage 217 is opened downstream of the heater core 205 and the fourth passage 223 is closed.

The third valve 229 is disposed and configured to selectively close or open the second passage 219. If the third valve 229 is positioned as illustrated in a solid line in FIG. 1, the second passage 219 is closed. On the other hand, if the third valve 229 is positioned as illustrated in a dotted line in FIG. 1, the second passage 219 is opened.

Figure 3:
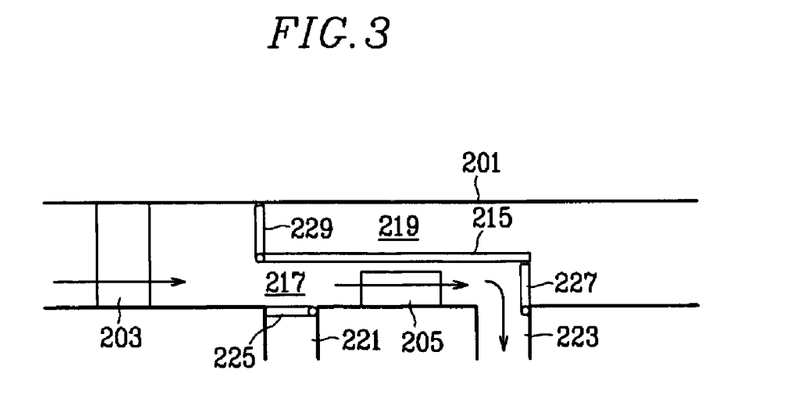
FIGS. 3-5 show operating states of a valve unit when a temperature of outside air is lower then an optimal temperature of outside air in an intercooler system according to an embodiment of the present invention.
Figure 4:
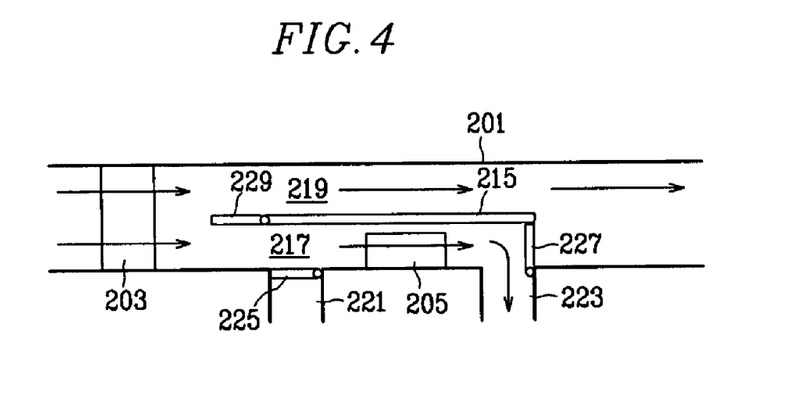
Figure 5:
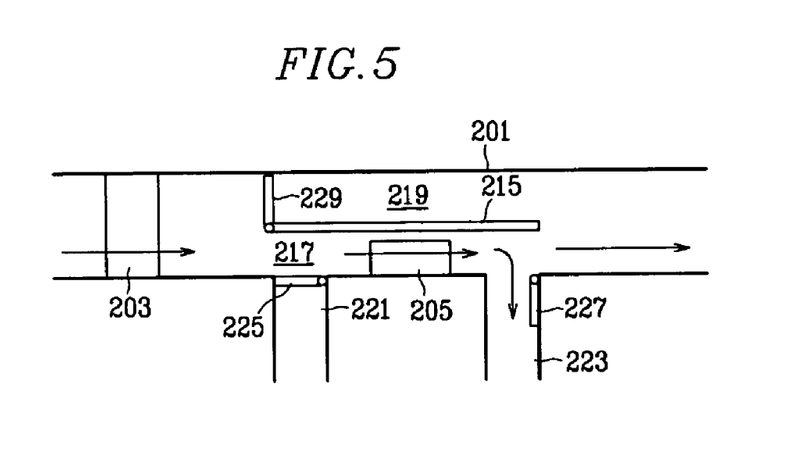

Hereinafter, referring to FIGS. 3-8, operations of the valve unit 107 will be explained in detail. FIGS. 3-5 show states of the valve unit 107 when the detected coolant temperature is lower than the predetermined coolant temperature.

As shown in the drawings, when the detected coolant temperature is lower than the predetermined coolant temperature, the control unit 109 controls the valve unit 107 such that outside air is heated by the heater core 205 and then is supplied to the intercooler 101 through the fourth passage 223. That is, as shown in FIGS. 3-5, the control unit 109 controls the first valve 225 such that the first passage 217 is opened upstream of the heater core 205 and the third passage 221 is closed. Meanwhile, the control unit 109 controls the second valve 227 such that the fourth passage 223 is opened. Therefore, outside air is supplied to the intercooler 101 through the fourth passage 223 after passing the heater core 205. Accordingly, outside air is heated by the heater core 205 and then is supplied to the intercooler 101.

As shown in FIG. 3, when the current operating mode of the air-conditioning system 200 is neither in the heating mode nor in the cooling mode (i.e., when there is no request by the operation of the air-conditioning system), the control unit 109 controls the second valve 227 such that the first passage 217 is closed downstream of the heater core 205 to close a passage being connected to the passenger room. The control unit 109 also controls the third valve 229 such that the second passage 219 is closed. Therefore, the conditioned air (i.e., the cooled air or heated air) is not supplied to the passenger room.

As shown in FIG. 4, when an operating mode of the air-conditioning system 200 is in the cooling mode, the control unit 109 controls the second valve 227 such that the first passage 217 is closed downstream of the heater core 205 to close a passage being connected to the passenger room. The control unit 109 also controls the third valve 229 such that the second passage 219 is opened. Therefore, the outside air, cooled by the evaporator 203, is supplied to the passenger room through the second passage 219.

As shown in FIG. 5, when the operating mode of the air-conditioning system 200 is in the heating mode, the control unit 109 controls the second valve 227 such that the first passage 217 is fully opened to allow the heated outside air to be supplied to the passenger room. The control unit 109 also controls the third valve 229 such that the second passage 219 is closed. Therefore, the outside air, heated by the heater core 205, is supplied to the passenger room.

Figure 6:
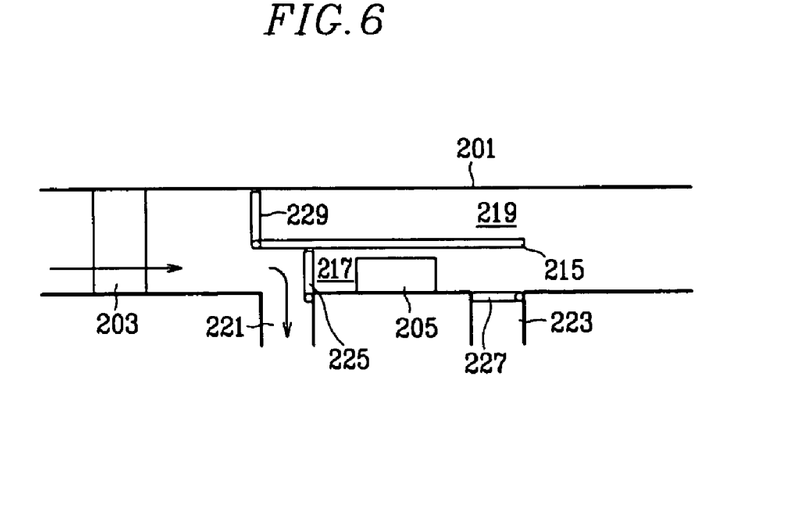
FIGS. 6-8 show operating states of a valve unit when a temperature of outside air is higher then an optimal temperature of outside air in an intercooler system according to an embodiment of the present invention.
Figure 7:
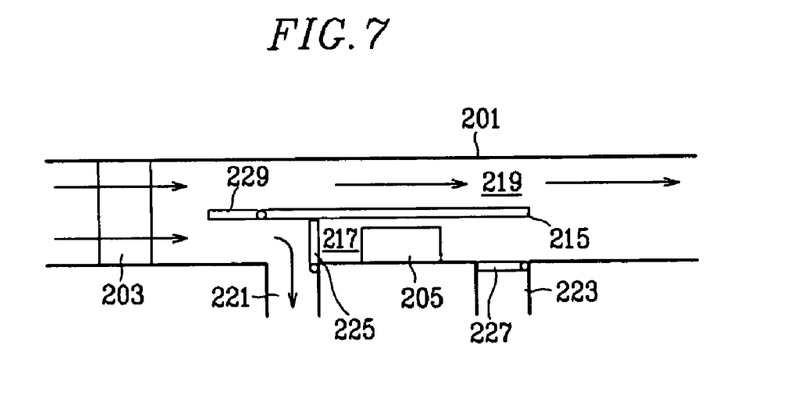
Figure 8:
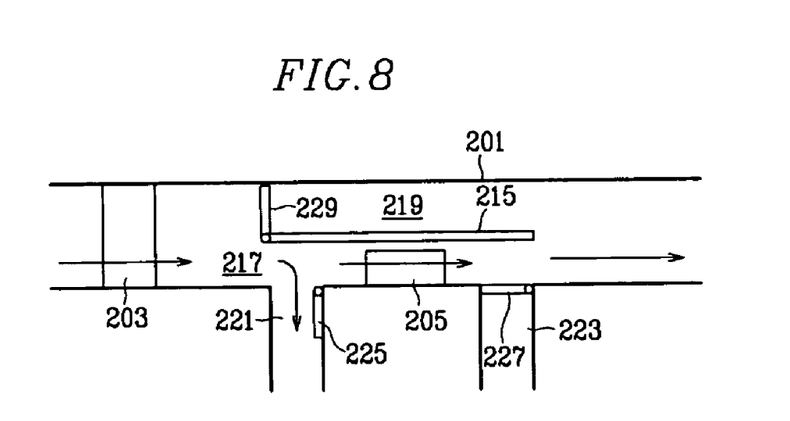

FIGS. 6-8 show states of the valve unit 107 when the detected coolant temperature is higher than the predetermined coolant temperature. When the detected coolant temperature is higher than the predetermined coolant temperature, the control unit 109 controls the air-conditioning system 200 to operate the evaporator 203 such that outside air is cooled by the evaporator 203. The control unit 109 also controls the valve unit 107 such that the outside air cooled by the evaporator 203 is supplied to the intercooler 101 through the third passage 221. That is, as shown in FIGS. 6-8, the control unit 109 controls the first valve 225 such that the third passage 221 is opened and controls the second valve 227 such that the fourth passage 223 is closed. Therefore, outside air passes the evaporator 203 and is supplied to the intercooler 101 through the third passage 221.

As shown in FIG. 6, when the current operating mode of the air-conditioning system 200 is neither in the heating mode nor the cooling mode (i.e., when there is no request for operation of the air-conditioning system), the control unit 109 controls the first valve 225 such that the first passage 217 is closed upstream of the heater core 205. The control unit 109 also controls the third valve 229 such that the second passage 219 is closed. Therefore, the outside air is not supplied to the passenger room.

As stated in the above, the control unit 109 controls the air-conditioning system 200 to operate the evaporator 203. For example, by controlling the compressor 211 of the air-conditioning system 200, the evaporator 203 can be controlled to operate. Consequently, outside air cooled by the evaporator 203 is supplied to the intercooler 101 through the third passage 221.

As shown in FIG. 7, when the operation mode of the air-conditioning system 200 is in the cooling mode, the control unit 109 controls the first valve 225 such that the first passage 217 is closed upstream of the heater core 205. The control unit 109 also controls the third valve 229 such that the second passage 219 is opened. Therefore, the outside air cooled by the evaporator 203 is supplied to the intercooler 101 through the third passage 221 and is simultaneously supplied to the passenger room through the second passage 219.

As shown in FIG. 8, when the operation mode of the air-conditioning system 200 is in the heating mode, the control unit 109 controls the first valve 225 such that the first passage 217 is opened upstream of the heater core 205. The control unit 109 also controls the third valve 229 such that the second passage 219 is closed.

In addition, as stated in the above, the control unit 109 controls the air-conditioning system 200 to operate the evaporator 203. Consequently, the outside air cooled by the evaporator 203 is supplied to the intercooler 101 through the third passage 221, and the outside air heated by the heater core 205 is supplied to the passenger room.

Hereinafter, referring to FIG. 9, the intake air cooling method according to an embodiment of the present invention will be explained. The intake air cooling method may use the above-stated intercooler system according to an embodiment of the present invention.

In step S910, a temperature of a coolant is detected. After detecting the temperature of the coolant, in step S920, outside air is heated or cooled by the air-conditioning system 200. Whether the outside air is heated or cooled is preferably determined on the basis of the detected coolant temperature. In step S930, the intake air passing through the intercooler 101 is conditioned by the heated or cooled outside air.

Figure 9:
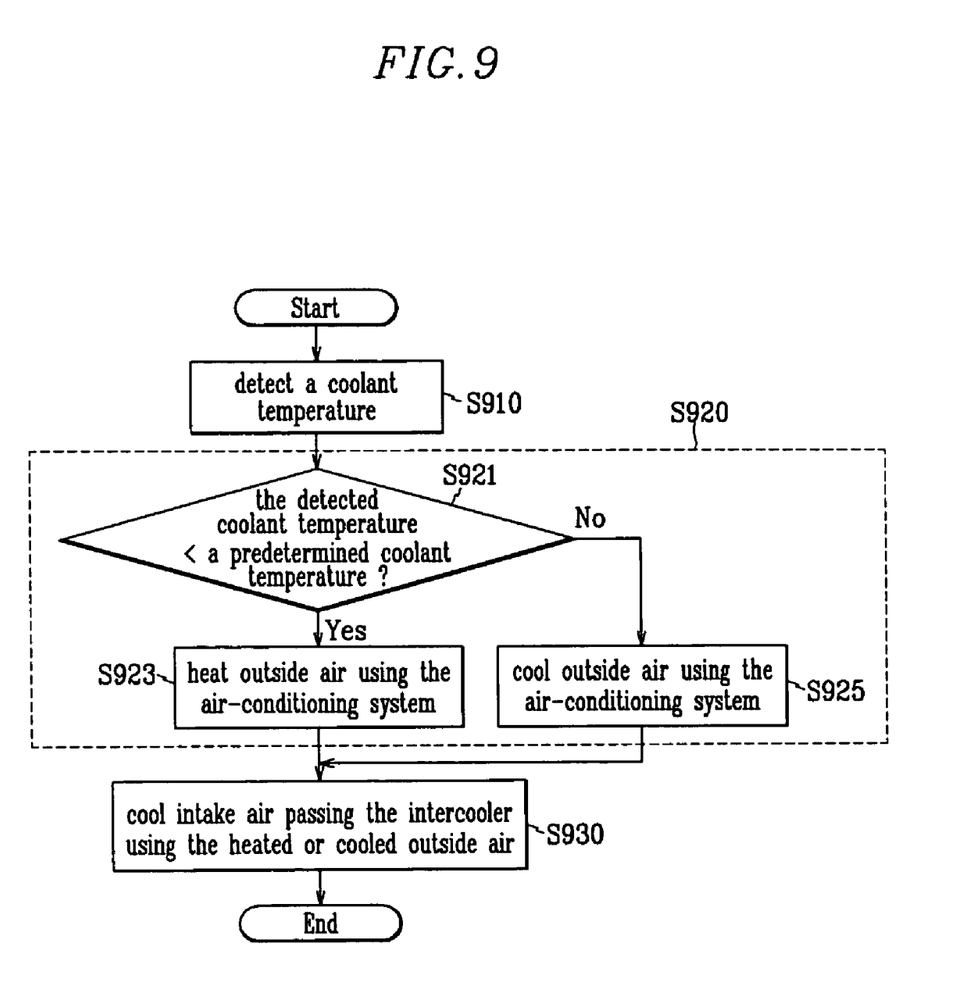
FIG. 9 is a flowchart of an intake air cooling method according to an embodiment of the present invention.

As shown in FIG. 9, in step S920, it is determined whether the detected coolant temperature is lower than the predetermined coolant temperature in step S921. As stated in the above, the predetermined coolant temperature can be set at a coolant temperature in which an engine is sufficiently warmed up. If the detected coolant temperature is lower than the predetermined coolant temperature, the outside air is heated by the heater core 205 of the air-conditioning system 200 in step S923.

On the other hand, if the detected coolant temperature is not lower than the predetermined coolant temperature, the outside air is cooled by the evaporator 203 of the air-conditioning system 200 in step S925. Consequently, in an initial engine starting state in which the engine is not sufficiently warmed up, the outside air is heated by the air-conditioning system 200 and is then supplied to the intercooler 101. On the other hand, in a state in which the engine is sufficiently warmed up, the outside air is cooled by the air-conditioning system 200 and is then supplied to the intercooler 101. Therefore, it can be prevented that the intake air is excessively cooled by the intercooler 101 in an initial engine starting state, and the cooling efficiency of the intercooler 101 can be improved while the engine operates in a normal state.

Although preferred embodiments of the present invention have been described in detail hereinabove, it should be clearly understood that many variations and/or modifications of the basic inventive concepts herein taught which may appear to those of ordinary skill in the present art will still fall within the spirit and scope of the present invention, as defined in the appended claims.

What is claimed is:

1. An intercooler system comprising:
   an air duct configured to be supplied with outside air;
   an evaporator;
   a heater core of an air-conditioning system being disposed within the air duct;
   an intercooler supplied with the outside air from the air duct and configured to cool intake air passing therethrough using the outside air;
   a valve unit for regulating flows of the outside air such that the outside air passes at least one of the evaporator and the heater core, and then is supplied to the intercooler;
   a control unit controlling operations of the air-conditioning system and the valve unit; and
   an engine coolant temperature sensor for detecting an engine coolant temperature, wherein if the detected engine coolant temperature is higher than a predetermined engine coolant temperature, the control unit controls the valve unit and the air-conditioning system such that the outside air is cooled by the evaporator and then is supplied to the intercooler.

2. The intercooler system of claim 1, wherein if the detected engine coolant temperature is lower than a predetermined engine coolant temperature, the control unit controls the valve unit such that the outside air passes the heater core and then is supplied to the intercooler.

3. The intercooler system of claim 1, wherein a portion of an inner passage of the air duct is divided into a first passage and a second passage downstream of the evaporator, the heater core being disposed within the first passage;
   wherein the first passage being communicated with the intercooler through a third passage at a portion upstream of the heater core and being communicated with the intercooler through a fourth passage at a portion downstream of the heater core; and
   wherein the valve unit comprises:
   a first valve configured to selectively open or close the first passage at a portion upstream of the heater core and the third passage;
   a second valve configured to selectively open or close the first passage at a portion downstream of the heater core and the fourth passage; and
   a third valve configured to selectively open or close the second passage.

4. The intercooler system of claim 3, further comprising a coolant temperature sensor for detecting a coolant temperature, wherein the control unit controls operations of the first valve, the second valve, and the third valve, based on the detected coolant temperature.

5. The intercooler system of claim 4, wherein if the detected coolant temperature is lower than a predetermined coolant temperature, the control unit controls the first valve such that the first passage is opened upstream of the heater core and the third passage is closed and controls the second valve such that the fourth passage is opened, so that the outside air is heated by the heater core and is then supplied to the intercooler.

6. The intercooler system of claim 5, further comprising an air-conditioning system operating mode switch detecting a current operating mode of the air-conditioning system, wherein if the current mode of the air-conditioning system is neither a heating mode for heating air inside a passenger room nor a cooling mode for cooling air inside the passenger room, the control unit controls the second valve such that the first passage is closed downstream of the heater core to close a passage connected to a passenger room and to control the third valve such that the second passage is closed.

7. The intercooler system of claim 5, further comprising an air-conditioning system operating mode switch for detecting a current operating mode of the air-conditioning system, wherein if the current operating mode of the air-conditioning system is a cooling mode for cooling air inside a passenger room, the control unit controls the second valve such that the first passage is closed downstream of the heater core to close a passage connected to a passenger room and controls the third valve such that the second passage is opened.

8. The intercooler system of claim 5, further comprising an air-conditioning system operating mode switch for detecting a current operating mode of the air-conditioning system, wherein if the current operating mode of the air-conditioning system is a heating mode for heating air inside a passenger room, the control unit controls the second valve such that the first passage is opened downstream of the heater core and controls the third valve such that the second passage is closed.

9. The intercooler system of claim 4, wherein if the detected coolant temperature is higher than a predetermined coolant temperature, the control unit controls the air-conditioning system to operate the evaporator, and the control unit controls the first valve such that the third passage is opened and controls the second valve such that the fourth passage is closed, so that the outside air is cooled by the evaporator and then is supplied to the intercooler.

10. The intercooler system of claim 9, further comprising an air-conditioning system operating mode switch for detecting a current operating mode of the air-conditioning system, wherein if the current operating mode of the air-conditioning system is neither a heating mode for heating air inside a passenger room nor a cooling mode for cooling air inside the passenger room, the control unit controls the first valve such that the first passage is closed upstream of the heater core and controls the third valve such that the second passage is closed.

11. The intercooler system of claim 9, further comprising an air-conditioning system operating mode switch for detecting a current operating mode of the air-conditioning system, wherein if the current operating mode of the air-conditioning system is a cooling mode for cooling air inside a passenger room, the control unit controls the first valve such that the first passage is closed upstream of the heater core and controls the third valve such that the second passage is opened.

12. The intercooler system of claim 9, wherein further comprising an air-conditioning system operating mode switch for detecting a current operating mode of the air-conditioning system, wherein if the current operating mode of the air-conditioning system is a heating mode for heating air inside a passenger room, the control unit controls the first valve such that the first passage is opened upstream of the heater core and controls the third valve such that the second passage is closed.

13. An intercooler system comprising:
an air duct configured to be supplied with outside air, an evaporator and a heater core of an air-conditioning system being disposed within an inner passage of the air duct, a portion of the inner passage of the air duct being divided into a first passage and a second passage downstream of the evaporator, and the heater core being disposed in the first passage;
an intercooler being connected to the first passage upstream of the heater core through a third passage and connected to the first passage downstream of the heater core through a fourth passage, the intercooler being configured to cool intake air passing therethrough using the outside air being supplied from the air duct through one of the third and fourth passages;
a first valve configured to selectively open or close the first passage upstream of the heater core and the third passage;
a second valve configured to selectively open or close the first passage downstream of the heater core and the fourth passage;
a third valve configured to selectively open or close the second passage; and
a control unit controlling the air-conditioning system to cool or heat the outside air and controlling the first, second, and third valves such that the cooled outside air is supplied to the intercooler or such that the heated outside air is supplied to the intercooler.

14. The intercooler system of claim 13, further comprising a coolant temperature sensor detecting a coolant temperature, wherein the control unit controls operations of the first, second, and third valves based on the detected coolant temperature.

15. The intercooler system of claim 14, wherein if the detected coolant temperature is lower than a predetermined coolant temperature, the control unit controls the first valve such that the first passage is opened upstream of the heater core and the third passage is closed and to control the second valve such that the fourth valve is opened, so that the outside air is heated by the heater core and is then supplied to the intercooler.

16. The intercooler system of claim 15, further comprising an air-conditioning system operating mode switch detecting a current operation mode of the air-conditioning system, wherein if the current operating mode of the air-conditioning system is neither a heating mode for heating air inside a passenger room nor a cooling mode for cooling air inside the passenger room, the control unit controls the second valve such that the first passage is closed downstream of the heater core and to control the third valve such that the second passage is closed.

17. The intercooler system of claim 15, further comprising an air-conditioning system operating mode switch for detecting a current operating mode of the air-conditioning system, wherein if the current operating mode of the air-conditioning system is a cooling mode for cooling air inside a passenger room, the control unit controls the second valve such that the first passage is closed downstream of the heater core and controls the third valve such that the second passage is opened.

18. The intercooler system of claim 15, further comprising an air-conditioning system operating mode switch for detecting a current operating mode of the air-conditioning system, wherein if the current operating mode of the air-conditioning system is a heating mode for heating air inside a passenger room, the control unit controls the second valve such that the first passage is opened downstream of the heater core and controls the third valve such that the second passage is closed.

19. The intercooler system of claim 14, wherein if the detected coolant temperature is higher than a predetermined coolant temperature, the control unit controls the air-conditioning system to operate the evaporator, and the control unit controls the first valve such that the third passage is opened and controls the second valve such that the fourth passage is closed, so that the outside air is cooled by the evaporator and then is supplied to the intercooler.

20. The intercooler system of claim 19, further comprising an air-conditioning system operating mode switch for detecting a current operating mode of the air-conditioning system, wherein if the current operating mode of the air-conditioning system is neither a heating mode for heating air inside a passenger room nor a cooling mode for cooling air inside the passenger room, the control unit controls the first valve such that the first passage is closed upstream of the heater core and controls the third valve such that the second passage is closed.

21. The intercooler system of claim 19, further comprising an air-conditioning system operating mode switch for detecting a current operating mode of the air-conditioning system, wherein if the current operating mode of the air-conditioning system is a cooling mode for cooling air inside a passenger room, the control unit controls the second valve such that the first passage is closed upstream of the heater core and controls the third valve such that the second passage is opened.

22. The intercooler system of claim 19, wherein further comprising an air-conditioning system operating mode switch for detecting a current operating mode of the air-conditioning system, wherein if the current operating mode of the air-conditioning system is a heating mode for heating air inside a passenger room, the control unit controls the first valve such that the first passage is opened upstream of the heater core and controls the third valve such that the second passage is closed.

23. An intake air cooling method using an air-conditioning system and an intercooler configured to cool intake air using outside air supplied from the air-conditioning system, comprising:
detecting an engine coolant temperature;
regulating a temperature of the outside air by heating or cooling the outside air using the air-conditioning system based on the detected engine coolant temperature; and
cooling the intake air introduced into the intercooler using the cooled or heated outside air;
wherein the regulating comprises:
determining whether the detected engine coolant temperature is upper than a predetermined engine coolant temperature; and
cooling the outside air using the air-conditioning system, if the detected engine coolant temperature is higher than the predetermined engine coolant temperature.

* * * * *